United States Patent Office 2,904,391
Patented Sept. 15, 1959

2,904,391
PRODUCTION OF POLYACRYLONITRILE THREADS, FIBRES, FILAMENTS AND THE LIKE

Albert Walter Bennett and Vera Isabella Furness, Coventry, England, assignors to Courtaulds, Limited, London, England, a British company No Drawing. Application August 20, 1957
Serial No. 679,136
Claims priority, application Great Britain September 10, 1956

4 Claims. (Cl. 18—54)

This invention relates to the production of polyacrylonitrile threads, fibres, filaments and the like, afterwards referred to generally as threads. The term "polyacrylonitrile" as used in this specification includes simple polymers of acrylonitrile and copolymers containing at least 85 percent by weight of acrylonitrile.

In the manufacture of polyacrylonitrile threads it has been proposed in United States specification No. 2,140,921 (Rein) to use concentrated aqueous solutions of thiocyanates as solvents for the polyacrylonitrile. British patent specification No. 714,530 describes the use of aqueous alcoholic solutions of thiocyanates as polyacrylonitrile solvents and the specification of application Serial No. 608,706 (Schmidt) describes a process for the production of spinning solutions of polyacrylonitrile by polymerising acrylonitrile, alone or with one or more other polymerisable compounds, in concentrated thiocyanate solution using a non-oxidising catalyst, such as azo-bis-isobutyronitrile.

It is known that polyacrylonitrile threads do not dye very readily and it has been proposed to improve the dyeing affinity by incorporating basic sites, for example amino groups, in the polymer. Although the incorporation of such groups improves the dyeing affinity, it also tends to have an adverse effect on the heat- and alkali-stability of the threads, particularly when concentrated thiocyanate solutions have been used as the polymer solvent.

The object of this invention is to improve the heat- and alkali-stability of such threads.

According to this invention, a process for the production of polyacrylonitrile threads comprises forming a polyacrylonitrile thread containing basic sites by wet spinning a polymer solution dissolved in a concentrated solution of a thiocyanate, and treating the resultant thread before drying with one or more aqueous solutions containing polymetaphosphate ions and phosphate ions. The treatment is conveniently effected in a single aqueous bath in which are dissolved a polymetaphosphate such as sodium hexametaphosphate and phosphoric acid or a soluble acid-phosphate. Suitable treating solutions contain from 1 to 15 percent of phosphoric acid or a soluble acid-phosphate and from 0.2 to 5 percent of sodium hexametaphosphate.

The treatment according to this invention may be effected at any stage after the thread has been formed and before the thread is dried. In cases where the basic sites are already present in the extruded polymer, the treatment can be effected immediately after the coagulation either before any washing or before stretching is effected or it may be effected after stretching and washing and before the final washing and drying steps.

The treatment according to this invention is applicable to threads formed from any acrylonitrile polymer containing basic sites, using concentrated thiocyanate solutions as the polymer solvent, and is applicable to copolymers of acrylonitrile with basic compounds or blends of acrylonitrile polymers or copolymers with other polymeric compounds containing basic sites; such other blended polymers may also be copolymers of acrylonitrile with basic compounds. Thus, it may be applied to acrylonitrile-quaternised ammonium salt copolymers formed for example from an acrylonitrile-vinyl pyridine copolymer in which the vinyl pyridine has been quaternised either in the polymer before spinning or in the extruded thread. The invention may also be applied to blends of polyacrylonitrile with a basic compound such as casein, with a vinyl pyridine polymer that has been quaternised or with an acrylonitrile-vinyl pyridine copolymer that has also been quaternised, or to the quaternised copolymers prepared by copolymerising an alkyl aryl sulphonate with the acrylonitrile and then reacting with a tertiary amine such as pyridine as described in our application Serial No. 411,004, now Patent No. 2,796,414 (Lowther and Reeder). Solutions of acrylonitrile-vinyl pyridine copolymers prepared directly in thiocyanate solution by the process claimed in our application Serial No. 608,706 may also be used, the copolymer after extrusion into thread form, being first quaternised and then treated according to this invention. The invention may also be applied to block copolymers of acrylonitrile and a polymer containing basic groups, for example polyethyleneimine, prepared for example as described in the above-mentioned application Serial No. 608,706.

The invention is illustrated by the following examples in which the parts and percentages are by weight.

Example 1

(a) Equal weights of 2-vinyl pyridine and acrylonitrile were polymerised together using 0.2 percent (based on the weight of acrylonitrile) of azo-bis-isobutyronitrile as catalyst. The copolymer was dissolved in its own weight of a 75:25 mixture of dimethyl formamide and methanol and quaternised by adding dimethyl sulphate slowly under a reflux condenser. 50 percent aqueous sodium thiocyanate solution was then added to precipitate the quaternised polymer as the thiocyanate salt. This salt was dissolved in 50 percent aqueous sodium thiocyanate solution to form a 12.5 percent solution.

(b) 90 parts of acrylonitrile and 10 parts of methyl acrylate were copolymerised in emulsion using a standard ammonium persulphate-sodium metabisulphite redox catalyst. The resultant copolymer (intrinsic viscosity 1.5) was dissolved in a mixture of 45 parts of sodium thiocyanate, 45 parts of water and 10 parts of methanol to form a 15 percent solution.

10 parts of the solution (a) and 90 parts of the solution (b) were blended together and the blended solution was extruded through a jet into a 10 percent aqueous solution of sodium thiocyanate. The resultant thread was washed in hot water, stretched 1,700 percent in steam and then passed for 10 minutes through a bath at 60° C. containing in each 100 ml., 3.5 grams of phosphoric acid (sp. gr. 1.75) and 0.75 gram of sodium hexametaphosphate. The tow was then washed in cold water and dried.

The thread obtained had improved affinity for acid dyes and withstood normal scouring and heat treatments without discolouration.

Example 2

The copolymer of 89.8 mol percent of acrylonitrile, 7.2 mol percent of methyl acrylate and 3.0 mol percent of allyl p-toluene sulphonate which had been reacted with pyridine as described in Example 4 of application Serial No. 411,004 was dissolved in a mixture of 45 parts of sodium thiocyanate, 45 parts of water and 10 parts of methanol to form a 15 percent solution. The solution was spun into water at 20° C. and the thread was washed in water, stretched 1,700 percent in steam and immersed for 20 minutes in a bath at 45° C. containing in each 100 ml. of 8 grams of phosphoric acid and 1.5 grams of sodium hexametaphosphate. The thread was then washed with water and dried.

The thread obtained had improved affinity for acid dyes and withstood normal scouring and heat treatments without discolouration.

*Example 3*

A mixture of 520 parts of a 50 percent aqueous sodium thiocyanate solution and 6 parts of a polyethyleneimine neutralised with acetic acid (molecular weight between 200 and 1,000 approximately) was heated to 80° C. and then a solution of 0.3 part of azo-bis-isobutyronitrile, 96 parts of acrylonitrile and 4 parts of methyl acrylate was added. After 5 minutes, polymerisation set in and the solution becomes increasingly viscous and slightly yellow, and bubbles of nitrogen were evolved. The temperature of the solution rose to 90° C.–92° C. and the solution was therefore cooled to 80° C. Polymerisation was completed after 90 minutes, and 0.3 part of sodium hydrosulphite was added to neutralise the catalyst.

The solution was spun directly into a coagulating bath consisting of a 10 percent aqueous sodium thiocyanate solution. The formed thread was washed with water, squeezed to remove excess water, and passed through a bath containing 3.5 grams of phosphoric acid and 0.75 gram of sodium hexametaphosphate per 100 mls. of solution, at a temperature of from 15° C. to 60° C.

The treated thread is squeezed to remove excess solution, washed with water again, and then heated to a temperature between 80° C. and 100° C. and stretched up to 1,700 percent before drying.

The thread obtained had improved affinity for acid dyes and withstood normal scouring and heat treatment without discolouration.

What we claim is:

1. In a process for the production of polyacrylonitrile threads by forming a polyacrylonitrile thread containing basic sites by extruding a solution of the polymer in a concentrated solution of a thiocyanate through a jet into an aqueous coagulating bath, the step of improving the heat- and alkali-stability of the threads by treating them before drying with polymetaphosphate ions and phosphate ions in aqueous solution.

2. A process as claimed in claim 1 in which the treatment of the threads is effected in a single solution containing both polymetaphosphate and phosphate ions.

3. A process as claimed in claim 2 in which the solution contains sodium hexametaphosphate and phosphoric acid.

4. In a process for the production of polyacrylonitrile threads in which a polyacrylonitrile thread containing basic amino sites is formed by extruding a concentrated aqueous thiocyanate solution of a polymer which polymer is at least 85% polyacrylonitrile into an aqueous coagulating bath, the improvement which comprises bringing the threads, before drying, into contact with a substance selected from the group consisting of phosphoric acid and soluble acid phosphates in aqueous solution, in concentrations of from about 1 to about 15 percent by weight, and with sodium hexametaphosphate in aqueous solution, in a concentration of from about 0.2 to about 5 percent by weight, whereby the heat and alkali stability of the threads is improved.

References Cited in the file of this patent
UNITED STATES PATENTS

| | | |
|---|---|---|
| 2,558,735 | Cresswell | July 3, 1951 |
| 2,648,592 | Stanton et al. | Aug. 11, 1953 |
| 2,648,593 | Stanton et al. | Aug. 11, 1953 |